United States Patent
Miller

(10) Patent No.: US 8,853,313 B2
(45) Date of Patent: Oct. 7, 2014

(54) THERMALLY CONDUCTIVE POLYMER COMPOSITIONS HAVING LOW THERMAL EXPANSION CHARACTERISTICS

(75) Inventor: James D Miller, Marietta, GA (US)

(73) Assignee: Cool Options, Inc., North Kingstown, RI (US)

( * ) Notice: Subject to any disclaimer, the term of this patent is extended or adjusted under 35 U.S.C. 154(b) by 45 days.

(21) Appl. No.: 13/483,467

(22) Filed: May 30, 2012

(65) Prior Publication Data

US 2012/0252951 A1    Oct. 4, 2012

Related U.S. Application Data

(62) Division of application No. 11/138,118, filed on May 26, 2005, now Pat. No. 8,221,885.

(60) Provisional application No. 60/576,366, filed on Jun. 2, 2004.

(51) Int. Cl.
*C08K 3/38* (2006.01)

(52) U.S. Cl.
CPC .............. *C08K 3/38* (2013.01); *C08K 2003/382* (2013.01)
USPC ........... 524/404; 428/412; 428/427; 428/447; 428/474.4; 428/480; 428/704

(58) Field of Classification Search
CPC ............................ C08K 3/38; C08K 2003/382
USPC .............. 524/404, 565, 571–575.5, 579, 582, 524/584–586; 428/412, 427, 447, 474, 428/474.4, 480, 704
See application file for complete search history.

(56) References Cited

U.S. PATENT DOCUMENTS

| | | | |
|---|---|---|---|
| 4,831,480 A | 5/1989 | Takeda | |
| 5,681,883 A | 10/1997 | Hill et al. | |
| 5,930,459 A | 7/1999 | Eckman et al. | |
| 6,160,042 A | 12/2000 | Ishida | |
| 6,162,849 A * | 12/2000 | Zhuo et al. | 524/404 |
| 6,251,978 B1 | 6/2001 | McCullough | |
| 6,300,695 B1 | 10/2001 | Neal | |
| 6,469,086 B1 * | 10/2002 | Neu et al. | 524/404 |
| 6,528,145 B1 | 3/2003 | Berger et al. | |
| 6,600,633 B2 | 7/2003 | Macpherson | |
| 6,685,855 B1 | 2/2004 | Miller et al. | |
| 2003/0139510 A1 | 7/2003 | Sagal et al. | |
| 2003/0236335 A1 * | 12/2003 | Miller et al. | 524/404 |
| 2005/0209383 A1 * | 9/2005 | Miller et al. | 524/404 |

* cited by examiner

*Primary Examiner* — Peter D Mulcahy
(74) *Attorney, Agent, or Firm* — Barlow, Josephs & Holmes, Ltd.

(57) ABSTRACT

An injection moldable, thermally conductive polymer composition that has ultra low CTE properties is provided. The composition is suitable both for substrate applications in high precision electronics assemblies as well as over molding applications in conjunction with ceramic substrates. The composition includes a base polymer matrix material loaded with thermally conductive filler, which imparts thermal conductivity to the polymer matrix while also maintaining or enhancing the dielectric properties of the base polymer. The resultant composition exhibits CTE properties in the range of between 9 ppm/° C. and 2 ppm/° C., exhibits an optical anisotropy of below 1.5, and a thermal conductivity of greater than 2 W/m° K. The composition is suitable for use in over molding applications in conjunction with virtually any suitable electronics substrate material without the introduction of mechanical stresses produced by large CTE differentials.

7 Claims, 1 Drawing Sheet

THERMALLY CONDUCTIVE POLYMER COMPOSITIONS HAVING LOW THERMAL EXPANSION CHARACTERISTICS

CROSS-REFERENCE TO RELATED APPLICATIONS

This application is a divisional of and claims priority from earlier filed U.S. patent application Ser. No. 11/138,118, filed May 26, 2005, which claims priority from U.S. Provisional Patent Application No. 60/576,366, filed Jun. 2, 2004, the contents of which are incorporated herein by reference.

BACKGROUND OF THE INVENTION

The present invention relates generally to thermally conductive polymer compositions having very low thermal expansion properties. More specifically, the present invention relates to a thermally conductive polymer composition suitable for use as a substrate in devices that require high dimensional stability, wherein the polymer is characterized as having a coefficient of thermal expansion (CTE) that closely matches the CTE of ceramic materials. The principal benefit to the present invention as compared to the prior art is that the polymer composition can be molded over the heat-generating article so that the composition encapsulates the article. In other instances, the polymer composition, itself, can be molded into a separate component such as a heat sink or electronics substrate. Then, the molded component can be attached, fastened, bonded, or otherwise adjoined to the heat-generating article.

There are numerous devices such as electrical motors, inkjet/laser printer heads, semiconductors, microprocessors, circuit boards, transistors, resistors, and the like that generate a substantial amount of heat during their operation. The heat must be removed in order for the device to function properly. It is known to mold a thermally conductive plastic material over such heat generating devices in some instances. Generally, the difficulty in the prior art arises from the fact that such over-molded thermally conductive polymer materials have a CTE value that is substantially different than the CTE of the encapsulated device. These different CTE values can lead to undesirable mechanical forces or a transfer of stress resulting in the differential expansion between the substrate and the thermally conductive polymer. For example, during operation of the underlying electronic device heat is generated, as a result of this heating process, the over molded plastic material will expand at a different rate than the rate at which the encapsulated device expands. The molded plastic material and encapsulated device will also contract at different rates once the heating process ends and the assembly begins to cool. These different expansion and contraction rates lead to the introduction of a great deal of localized mechanical stresses being introduced into the assembly.

There have been numerous laminated compositions that have been manufactured in an attempt to constrain the CTE of the resultant composition. In these compositions, laminate structures contain networks of fiber reinforcing that serve to constrain movement as a function of increasing temperature. The difficult found in this process is that laminate construction is basically a two dimensional process that greatly limits the potential geometry of the finished article.

In other cases, molded polymers having constrained CTE properties have been produced using fibrous reinforcement. This method however is mostly impractical because molding operations require a flow pattern that results in orienting the fibers along the flow patterns within the mold thereby creating a large CTE anisotropy wherein the finished part has a great differential in CTE properties within itself. Specifically, the CTE properties are reduced along the flow directions wherein the reinforcing fibers are aligned, but the CTE remains relatively large across the flow directions within the part.

Some prior art attempts have been directed toward creating a molded polymer composition having reduced CTE values that are not subject to the anisotropy identified above. In order to overcome some of the stresses created by this CTE differential between the substrate material and the over molded thermally conductive polymer material, these attempts have eliminated the use of fiber reinforcing in favor of creating a polymer composition that has a native CTE that is closely matched to the CTE of the substrate being over molded. In most cases, however, the substrate is formed from a metal, which typically has a CTE in the range of between 11 ppm/°C. and 27 ppm/°C. Accordingly, the polymer composition that is utilized for over molding need only have a CTE that also falls within this range. For example, U.S. Pat. No. 4,831,480 discloses a carriage apparatus wherein a magnetic head mounted onto a die-cast metal substrate is over molded with a thermally conductive polymer wherein the die-cast metal has a CTE of approximately 24 ppm/°C. In this case, it was relatively easy to produce a polymer composition having a CTE in the desired range because most of the common base polymers have a native CTE in the desired range. Liquid crystal polymer has native CTE properties of between 3 ppm/°C. and 17 ppm/°C. when manufactured in thin films and approximately 30 ppm/°C. when utilized to product three-dimensional objects. PTFE has a CTE range of between 9 ppm/°C. and 12 ppm/°C. Polyamide has a CTE of approximately 20 ppm/°C. Accordingly, virtually any filler in the loading ranges disclosed would produce a finished composition having a CTE that is closely matched to the substrate CTE value of between 11 ppm/°C. and 24 ppm/°C.

In an alternative approach, U.S. Pat. No. 6,600,633 discloses an actuator for an optical disk drive, wherein a coil assembly is over molded utilizing a thermally conductive liquid crystal polymer resin. In this case the concern is not principally directed towards the matching of the CTE's between the substrate and the over mold materials but instead attempts to keep the operating temperature of the overall assembly low enough to prevent it from reaching a point where the mismatched CTE's result in differential stresses. In this reference, the composition is simply formulated to have a thermal conductivity value that is high enough to maintain the substrate at an operational temperature that is below the critical range wherein differential CTE properties become problematic.

While both of these disclosures are well suited for their particular application, none of the prior art references provide a solution that is suitable for applications wherein a high precision task requires extreme dimensional stability at greatly elevated operational temperature ranges. For example, FIG. 1 illustrates a print head for high precision printers that utilize hundreds of ink nozzles and/or miniature heaters 1, all of which are positioned in closely spaced arrays on single substrate material 2. During operation each of the heaters 1 is utilized to either disperse the ink from the nozzle (ink dispersion type printers) or cause ink located on an adjacent ink carrier ribbon to be transferred (thermal transfer type printers). As can be appreciated, during any given print operation a large amount of waste heat is produced within the print head array that must be dissipated. Should the waste heat not be effectively dissipated, it will accumulate in the substrate 2 of the print head. In cases wherein the substrate 2 used to support the print head has a relatively large CTE, the substrate 2 will ultimately expand to a point wherein the print quality will be dramatically decreased. Accordingly, most print head manufacturers have utilized ceramic substrates 2 with CTE values in the range of between 2 ppm/° C. and 9 ppm/° C., nearly a full order of magnitude lower than the CTE values discussed above with respect to metallic substrates. Further, while an example is provided that discloses a print head, the underlying issue impacts any electronic assembly wherein a high degree of dimensional stability is required even at elevated operational temperature ranges.

To assist in dissipating the waste heat encountered in such applications, heat sinks 3 have been developed to provide additional surface area and heat dissipating volume through which the waste heat can be managed. Generally, such heat sinks 3 are affixed to the substrate 2 using an adhesive layer 4. The problem is that machined metallic heat sinks 3 having CTE values that are much greater than the ceramic substrates 2 tend to expand at a higher rate than the substrate to which they are mounted resulting in the introduction of differential stresses in the substrate 2 and frequent failure of the bond 4 between the heat sink 3 and the substrate 2. Further, metallic heat sinks 3 are relatively expensive to manufacture requiring extensive machining to produce the desired heat sink geometry. Similarly, the thermally conductive polymers utilized to over mold heat sinks 3 in the prior art exhibit undesirable CTE properties that are also a full order of magnitude greater than the CTE values of the ceramic substrates 2 utilized in such high precision electronics devices. In addition, as discussed above, where the operation temperature range of the assembly is much lower, a polymer solution works because it succeeds in transferring sufficient heat away from the assembly substrate 2 before the overall device reaches a temperature wherein differential CTE properties become problematic. In the types of applications anticipated within the present application, it is simply not possible to maintain an operating temperature at such a low threshold. As a result, the industry to date has resorted to forming the substrates 2 and the associated heat sinks 3 from the same ceramic materials in order to achieve the necessary dimensional stability and thermal conductivity necessary to maintain the precision that is critical in such applications.

While forming the substrates and heat sinks from ceramics has produced a high precision and highly thermally conductive assembly, the costs associated with manufacturing such an assembly is dramatically higher than other conventional manufacturing methods. When manufacturing ceramics, the materials must be compression molded and sintered to solidify the base materials before the assembly can be removed from the mold. This type of molding process is time consuming and costly, in addition to the fact that the overall molding process results in a large amount of part shrinkage, wherein further anti-compaction and shrink reduction agents must be added to the base composition to overcome some of the undesirable shrinkage.

In view of the foregoing, there is a need for a thermally conductive polymer composition, which has properties that are complimentary to the properties of the low CTE materials utilized in high precision operations. There is a further need for a thermally conductive polymer composition that has CTE values in the ranges typically encountered in ceramic materials thereby providing the dimensional stability required for such high precision operations. Finally, there is a need for a thermally conductive polymer having ultra low CTE properties while also being net-shape moldable, thereby reducing the overall cost to manufacture such high precision components.

BRIEF SUMMARY OF THE INVENTION

In this regard, the present invention provides for an injection moldable, thermally conductive polymer composition that has ultra low CTE properties, making it suitable both for substrate applications in high precision electronics assemblies as well as over molding applications in conjunction with ceramic substrates. The composition includes a base polymer matrix material that is loaded with thermally conductive filler, which imparts thermal conductivity to the polymer matrix while also maintaining or enhancing the dielectric properties of the base polymer. The resultant composition exhibits highly desirable CTE properties of at least below 10 ppm/° C. and more preferably in the range of between 9 ppm/° C. and 2 ppm/° C. Further, the composition of the present invention exhibits an optical anisotropy of below 2.0 and more preferably of below 1.5. The composition of the present invention results in a material that is highly suitable for use in over molding applications in conjunction with virtually any suitable electronics substrate material while maintaining its desirable performance characteristics over a broad operational temperature range without the introduction of mechanical stresses produced by large CTE differentials. Further, the mechanical properties of the composition of the present invention make it suitable for use as an injection moldable substrate material in place of many of the prior art substrates currently in use.

In addition to exhibiting the highly desirable material properties detailed above, the composition of the present invention is suitable for injection molding. This aspect of the composition is advantageous in that any prior art compositions exhibiting similar mechanical properties to the composition of the present invention had to be formed by a process other than injection molding. It is the net shape moldable aspect of the composition of the present invention in conjunction with the highly desirable material properties including an ultra low CTE and greatly reduced optical anisotropy that represent a dramatic improvement over the compositions described in the prior art.

It is therefore an object of the present invention to provide a polymer composition having an ultra low CTE that is suitable of use in conjunction with common electronic substrate materials. It is a further object of the present invention to provide a polymer composition that is net shape injection moldable while having a CTE of less than 10 ppm/° C. It is yet a further object of the present invention to provide a net shape injection moldable polymer composition that has an ultra low CTE in the range of between 2 ppm/° C. and 9 ppm/° C. that is suitable for use in applications that require over molding of ceramic substrates. It is still a further object of the present invention to provide a net shape injection moldable polymer composition that has an ultra low CTE in the range of between 2 ppm/° C. and 9 ppm/° C. and an optical anisotropy of 2.0 or less. It is an even further object of the present invention to provide a polymer composition that as an ultra low CTE in the range of between 2 ppm/° C. and 9 ppm/° C. and an optical anisotropy of 2.0 or less, wherein the polymer composition is suitable for use as a substrate in high precision electronics applications normally reserved for ceramic materials.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
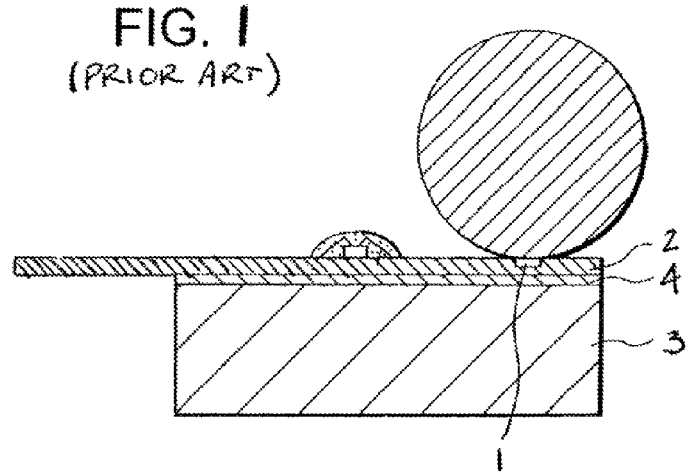
FIG. 1 is a schematic cross-sectional view of a print head and heat sink assembly from the prior art.

Now referring to the preferred embodiment of the present invention, a polymer composition is provided which, in its finished form, has a high thermal conductivity while also having a CTE value that is ultra low. The unique material properties of the composition of the present invention make it suitable for use in conjunction with ceramic substrates or for use in forming the substrate itself wherein a highly dimensionally stable, yet thermally conductive material is required. Further, the composition is net shape moldable allowing for injection molding of complex geometries.

The polymer composition of the present invention includes a base polymer matrix. Preferably, the base polymer matrix is a thermoplastic or thermosetting polymer. Examples of suitable thermoplastic polymers include, for example, liquid crystal polymers; polyamides; polyphthalamides; acrylonitrile-butadiene-styrene copolymers; polyaryl ether resins such as polyphenylene sulfide and polyphenylene oxide; polycarbonates; polyolefins; acrylics; and polyesters such as polyethylene terephthalate and polybutylene terephthalate. Additionally, suitable thermosetting polymers include elastomers and epoxies.

The composition also includes a thermally conductive filler material that is loaded into the base polymer matrix and uniformly mixed throughout the polymer matrix to fully wet out the filler and uniformly disperse the filler within the matrix. The filler material imparts thermal conductivity to the nonconductive polymeric matrix while also serving to lower the CTE of the overall composition. Further, the filler material generally has good electrically insulating properties thereby maintaining or enhancing the dielectric strength of the overall resultant composition. Suitable filler materials include, for example, alumina, calcium oxide, titanium oxide, silicon oxide, zinc oxide, silicon nitride, aluminum nitride, and boron nitride. Mixtures of such materials can also be used. The thermally conductive material may be in any form suitable for incorporation into a polymer matrix and may have a variety of shaped structures such as, for example, plate, strand, hexagonal and spherical-like shapes. Further, the particles may have either a relatively high aspect (length to thickness) ratio or a relatively low aspect ratio.

In the preferred embodiment, the polymer composition of the present invention is formulated generally to contain thermally conductive filler in the amount of about 20% to about 80% by weight, and base polymer matrix in the amount of about 20% to about 80% by weight. More preferably, the polymer composition of the present invention is formulated generally to contain thermally conductive filler in the amount of about 60% to about 80% by weight, and base polymer matrix in the amount of about 20% to about 40% by weight. These percentages are merely offered as a general guide as the particular percentages of filler and polymer will vary based on the type of base polymer and filler used. More importantly, the volumes of filler and polymer will be adjusted to match the desired CTE properties as well as to produce the desired resultant characteristics of an ultra low CTE and a low anisotropic value. The filler is added to and mixed uniformly with the base polymer. Also, the mixture may contain other additives such as, for example, flame-retardants, antioxidants, mold release agents, plasticizers, and dispersing aids.

As was stated above, the polymer composition of the present invention preferably has a CTE in the range of between about 2 ppm/° C. to about 10 ppm 1° C. and more preferably in the range of between about 4 ppm/° C. to about 8 ppm/° C. It can be noted that this CTE range is much lower than the CTE range available in thermally conductive polymer compositions found in the prior art and is well suited for use in conjunction with high precision electronics substrates such as ceramics with a CTE of approximately 7 ppm/° C. and silicon with a CTE of approximately 4 ppm/° C. Further, the filler loadings in the polymer composition can be tailored so that the CTE of the composition can be matched with that of the heat generating devices with which they will be used. This matching of CTE properties is desirable, because it helps reduce the mechanical stresses placed on the assembly. With similar CTE values, the polymer composition and heat-generating device will tend to expand and contract at approximately the same rate, allowing for tighter tolerances and fittings between the components in the assembly.

In addition to having matching CTE properties, the polymer composition of the present invention also exhibits several other highly desirable material properties. The composition preferably exhibits in-plane optical anisotropy in the molten state. In other words, the molten polymer permits the transmission of polarized light. Preferably, the optical anisotropy ratio is less than 2.0 and more preferably less than 1.5. Ultimately this translates to uniform dispersion of the filler with little filler polarization wherein the finished part will conduct heat in a more uniform manner in any required direction.

Further, the polymer composition has good thermal conductivity. Preferably, the polymer composition has a thermal conductivity, as measured through the thickness of the material, of greater than 1 W/m° K and more preferably greater than 2 W/m° K; and as measured through the in-plane direction of the material of greater than 4 W/m° K and more preferably greater than 6 W/m° K.

The polymer composition of the present invention also has good electrically insulating properties. For example, the polymer composition in accordance with the present invention exhibits a volume resistivity of greater than $1.0 \times 10^{12}$ ohms-cm, preferably greater than $1.0 \times 10^{14}$ ohms-cm, and more preferably greater than $1.0 \times 10^{16}$ ohms-cm, as well as a surface resistivity of greater than $1.0 \times 10^{13}$ ohms. The polymer composition also has a density of less than 2.0 g/cc; a dielectric constant of less than 4.0; a dielectric strength greater than 400 V/mil; and a loss factor of less than 0.1.

What is particularly notable with regard to the composition of the present invention is that the polymer composition can be net shape molded into any desired article using an over molding, melt extrusion, injection molding or other suitable process. This is particularly advantageous because the ability to form the desired components utilizing traditional net shape molding processes serves to greatly reduce the cost of manufacturing the part. As is known in the art, net shape molding produces an injection molded part wherein the part is complete upon removal from the molded and requires no further processing to produce the desired part geometry. This is a large improvement of similar devices formed in the prior art wherein compression molding of a layed up laminate part or sintering of a monolithic ceramic part was required. For example, the polymer composition of the present invention can be molded over an electric motor or other electronic device. The composition can be molded over the heat-generating device so that it at least partially encapsulates and supports the device. This over-molding or insert-molding process can be used to make a wide variety of packages and assemblies. As discussed above, the molded polymer composition has a coefficient of thermal expansion that closely matches the coefficient of thermal expansion of the encapsulated device. This helps minimize the mechanical stresses placed on the molded assembly that result from a CTE mismatch between the encapsulant and the encapsulated device as the overall assembly heats up during use.

Figure 2:
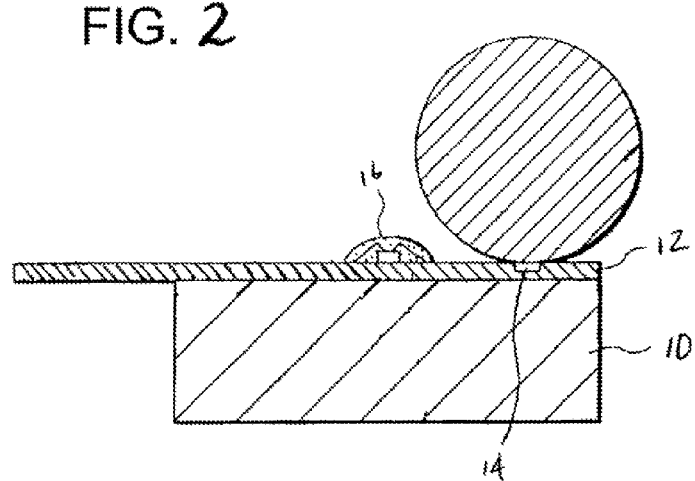
FIG. 2 is a schematic cross-sectional view of a print head assembly manufactured in accordance with the polymer over molding techniques taught in the present invention.

Turning now to FIG. 2, a print head assembly is illustrated and manufactured utilizing the polymer composition of the present invention. This is just one example of the many different types of structures and devices that can be formed with the composition of the present invention. In this particular illustration the polymer composition is illustrated as a heat sink 10, which has been over molded onto a ceramic substrate 12. The ceramic substrate 12 can be seen to include one of an array of heaters 14 thereon and a transistor 16 for controlling the heater 14. The substrate 12 was formed as ceramic because of the particularly low CTE value associated with ceramic materials. In this manner, the substrate 12 is highly dimensionally stable even under high thermal loadings. This allows the spacing between each of the heaters 14 in the array to remain uniform and precise during the operation of the print head. When forming the heat sink 10 portion of the print head by over molding it onto the ceramic substrate 12, a number of advantages are realized. First, the heat sink 10 does not have to be machined and then applied to the substrate 12. This eliminates the need for adhesives and the introduction of additional heat transfer interface surfaces. Further, by over molding the heat sink 10 onto the substrate 12, the heat sink 10 tends to have more intimate contact with the surface of the substrate 12, thereby insuring the highest efficiency possible for heat transfer and a stronger bond between the substrate 12 and the heat sink 10. Further, since the CTE of the substrate 12 and the CTE of the polymer composition utilized in the heat sink 10 are substantially matched to one another in the range of between about 2 ppm/° C. and 10 ppm/° C., the mechanical stresses that typically result from a CTE mismatch along the bond line are virtually eliminated.

Figure 3:
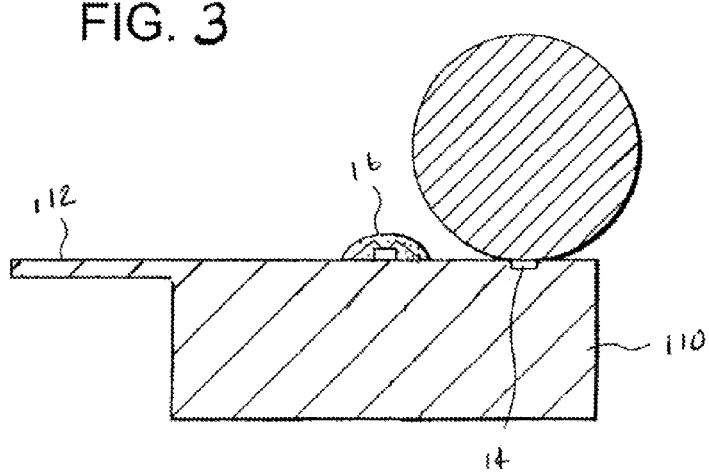
FIG. 3 is a schematic cross-sectional view of a print head assembly manufactured in accordance with an alternate embodiment of the polymer over molding techniques taught in the present invention.

Turning now to FIG. 3, an example is provided wherein the entire circuit substrate 112 and heat sink 110 are formed monolithically in a single net shape molding process. This can be accomplished by insert molding the array of heaters 14 into the monolithic substrate 112 or applying the heaters 12 to the surface of the substrate 112 after it has been formed. In this manner, the potential for CTE mismatch has been eliminated entirely in that there is no material differential between the heat sink 110 and the substrate 112 in that it has all been formed monolithically. This is possible when utilizing the composition of the present invention because the composition is as dimensionally stable as the typical ceramic substrates currently utilized in the art. Further, the injection moldable properties of the composition of the present invention allow the formation of complex geometries that typically cannot be achieved through machining or compression molding.

While the use of the composition of the present invention has been illustrated in the context of a print head assembly, it should be appreciated that the teachings of the present invention are also suitable in a large range of electronics applications wherein a highly dimensionally stable composition is needed for the fabrication of an electronics substrate, for the encapsulation of an electronic component or for over molding accessories such as heat sinks onto electronics components.

The following examples are provided to illustrate several possible filler and base polymer loading combinations that would be suitable in accordance with the teachings of the present invention thereby producing a thermally conductive polymer composition having an ultra low CTE that is matched to the CTE properties of substrates such as ceramics or silicon.

Example 1

A composition comprising boron nitride (BN) particles dispersed in a polybutylene terephthalate (PBT) polymer matrix. The BN particles are present in an amount of about 75% by weight based on the weight of the composition and the PBT base polymer matrix comprises the remaining 25% by weight of the composition. The resulting composition has the following properties:

| | |
|---|---|
| CTE (flow) | 10.2 ppm/° C. |
| CTE (transverse) | 9.6 ppm/° C. |
| Optical Anisotropy Ratio | 1.06 |

Example 2

A composition comprising boron nitride (BN) particles dispersed in a polyphenylene sulfide (PPS) polymer matrix. The BN particles are present in an amount of about 65% by weight based on the weight of the composition and the PPS base polymer matrix comprises the remaining 35% by weight of the composition. This composition had the following properties:

| | |
|---|---|
| CTE (flow) | 6.8 ppm/° C. |
| CTE (transverse) | 6.1 ppm/° C. |
| Optical Anisotropy Ratio | 1.1 |

Example 3

A composition comprising boron nitride (BN) particles dispersed in a liquid crystal polymer (LCP) polymer matrix, wherein the BN particles are present in an amount of about 60% by weight based on the weight of the composition and the LCP base polymer matrix comprises the remaining 40% by weight of the composition. This composition had the following properties:

| | |
|---|---|
| CTE (flow) | 7.8 ppm/° C. |
| CTE (transverse) | 7.3 ppm/° C. |
| Optical Anisotropy Ratio | 1.06 |

The above examples are meant only to illustrate some compositions that can be made in accordance with the present invention, and these examples should not be construed as limiting the scope of the invention.

It can therefore be seen that the present invention provides a novel thermally conductive polymer composition that has an ultra low CTE, which makes it particularly suitable for use in conjunction with heat generating electronics assemblies requiring a high degree of dimensional stability. The novel polymer composition can also be used for forming electronic connectors for increased contact or lead density without shorting between contacts due to creep from temperature changes as found in the prior art. Further, the present invention can be modified to provide a CTE that matches the CTE of the underlying substrate such as silicon and ceramic materials in a manner that was previously unknown in the prior art. For these reasons, the composition of the present invention is believed to represent a significant advancement in the art, which has substantial commercial merit.

It is appreciated by those skilled in the art that various changes and modifications can be made to the illustrated embodiments and description herein without departing from the spirit and scope of the underlying inventive concept and that the same is not limited to the particular forms herein shown and described except insofar as indicated by the scope of the appended claims.

What is claimed:

1. A thermally conductive polymer, dimensionally stable high precision electronics substrate comprising:
   a base polymer resin of between about 20% to about 40% by weight; and
   a thermally conductive boron nitride filler of between about 80% to about 60% by weight, said filler being uniformly dispersed throughout said base polymer resin, wherein said substrate has a coefficient of thermal expansion that is less than about 10 ppm/° C. and matches the coefficient of thermal expansion for silicon and ceramic materials employed in said electronics, said substrate having mechanical properties that provide a surface wherein microelectronic circuits are formed directly thereon.

2. The thermally conductive polymer substrate of claim 1, wherein said substrate has a coefficient of thermal expansion of between about 2 ppm/° C. and about 10 ppm/° C.

3. The thermally conductive polymer substrate of claim 1, wherein said substrate has a coefficient of thermal expansion of between about 4 ppm/° C. and about 7 ppm/° C.

4. The thermally conductive polymer substrate of claim 1, wherein said substrate has a thermal conductivity of greater than at least 2.0 W/m° K.

5. The thermally conductive polymer substrate of claim 1, wherein said substrate has an optical anisotropy of less than 1.5.

6. The thermally conductive polymer substrate of claim 1, wherein said base polymer resin is selected form the group consisting of: liquid crystal polymers, polyamides, polyphthalamides, acrylonitrile-butadiene-styrene copolymers, polyphenylene sulfide, polyphenylene oxide, polycarbonates, polyolefins, acrylics, polyesters, polybutylene terephthalate, elastomers and epoxies.

7. The thermally conductive polymer substrate of claim 1, wherein said substrate is an injection molded polymer substrate.

* * * * *